June 24, 1952 R. SMITH-JOHANNSEN 2,601,336

PROCESS OF ADHERING SILICONE RUBBER TO COPPER

Filed Feb. 17, 1949

Inventor:
Robert Smith-Johannsen,
by Abraham Cohen
His Attorney.

Patented June 24, 1952 2,601,336

UNITED STATES PATENT OFFICE 2,601,336

PROCESS OF ADHERING SILICONE RUBBER TO COPPER

Robert Smith-Johannsen, Schenectady, N. Y., assignor to General Electric Company, a corporation of New York Application February 17, 1949, Serial No. 77,044

4 Claims. (Cl. 154—130)

Figure 1:
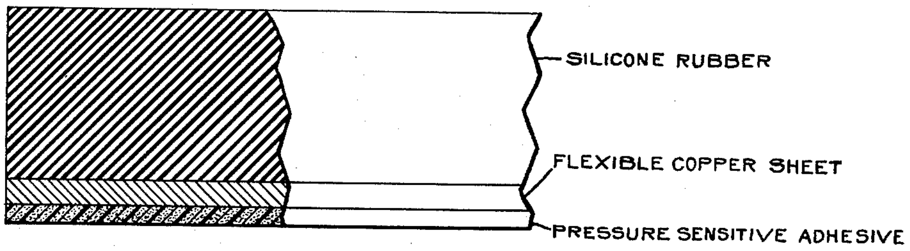

This invention is concerned with cupreous articles of manufacture having many useful applications. More particularly, the invention relates to an article of manufacture comprising (1) a copper-type or cupreous surface, as, for instance, a copper surface, a copper alloy surface (for example, those containing at least 20 to 30 per cent or more, by weight, copper), etc., and (2) an adherent layer of a solid, elastic, curable organopolysiloxane applied directly to at least one side of the aforesaid surface, the said organopolysiloxane containing a filler, and methods of preparing the same.

One of the objects of this invention is to improve the adhesion of silicone rubber to a copper-type surface.

Another object of the invention is to produce silicone rubber coated copper surfaces having good heat-resistance and good flexibility at low temperatures.

A still further object of the invention is to prepare flexible copper sheets coated with silicone rubber capable of sealing openings.

Other objects of this invention will become more apparent as the description thereof proceeds.

In my copending application, Serial No. 77,045 filed concurrently herewith and assigned to the same assignee as the present invention, there are disclosed and claimed methods for improving the adhesion of various kinds of resinous and solid, elastic organopolysiloxanes to different types of solid surfaces other than copper surfaces. The methods disclosed in the aforementioned copending application do not give satisfactory bonding between solid, elastic organopolysiloxanes and copper surfaces due apparently to the formation on said surfaces of chemical reaction products which interfere with the establishment of a firm bond between the copper surface and the solid, elastic organopolysiloxane.

I have now discovered that I am able to effect good bonding between a surface comprising copper and solid, elastic organopolysiloxanes if, prior to contacting the cupreous surface with the solid, elastic curable organopolysiloxane (for brevity hereinafter referred to as "silicone rubber"), the copper-type surface is treated in such a manner so as to remove oxide formation from the copper surface, and to inhibit further oxide formation at room temperature on the copper surface until it is possible to apply the solid, elastic organopolysiloxane to the cleaned surface.

By the terms "copper-type" or "cupreous" employed in the specification and in the appended claims are intended to mean pure copper surfaces or surfaces comprising copper including alloys of copper, especially, though not necessarily, copper alloys in which copper is present in an amount equal to at least about 20 to 50 per cent or more, by weight, for example, bronze, brass, etc., surfaces.

In accordance with my invention, a cupreous surface is first cleaned, for example, by dipping in a degreasing solution ordinarily employed in the metallurgy art, and thereafter washed and dipped again into a solution capable of removing oxide formation from the copper and substantially inhibiting future oxidation thereof at room temperature. The treated copper surface is then washed carefully with water and dried. In order to assist in preventing undesirable new oxidation of the copper surface, it has been found expedient to avoid using any heat for drying the surface, but instead to dry the same, for instance, by means of air pressure, for example, air jets, which are allowed to play over the surface of the copper, or by any other suitable means.

Thereafter the silicone rubber, advantageously containing a filler, is applied to the treated surface of the copper by suitable means. One method found satisfactory for applying the silicone rubber has been to feed flexible copper-type sheet or foil into calendar rolls while at the same time permitting a "pool" of the silicone rubber, preferably in the form of a paste or dough (i. e., molding compound), to lie on the pretreated surface of the copper so that as the copper sheet is fed into the calender rolls it will carry with it a thin film of the silicone rubber. Of course, other means where desirable or necessary, such as spraying or painting solutions of the silicone rubber, may also be employed for applying the silicone rubber to the copper surface without departing from the scope of the invention.

The solid, elastic, curable organopolysiloxane employed is, as pointed out above, preferably, though not essentially in the form of a paste to permit ease in fabrication. Although the particular silicone rubber employed may vary and may comprise any one of the many types disclosed in my aforementioned copending application, Serial No. 77,045, which, by reference, is made a part of this application, it is preferred that the silicone rubber comprise an elastic, curable methyl polysiloxane containing an average of from about 1.95, preferably 1.98, to 2.0 methyl groups per silicon atom, such materials being more particularly disclosed and claimed in Agens Patent 2,448,756, issued September 7, 1948, and assigned to the same assignee as the present invention. The silicone rubbers employed in the instant claimed invention may be prepared by condensing liquid organopolysiloxanes using various condensing agents to form the gum, i. e., the unfilled, elastic, curable organopolysiloxane, as is more particularly described in the aforementioned Agens patent, in Sprung et al. Patent 2,448,556; in Poskitt and Irby Patent No. 2,467,853 issued April 19, 1949; and in other applications, for example, Safford application, Serial No. 676,119, filed June 11, 1946, now Patent No. 2,454,759; Marsden et al. application, Serial No. 598,913, filed June 11, 1945, now Patent No. 2,469,883; Sprung application, Serial No. 676,091, filed June 11, 1946, now Patent No. 2,472,629; all the foregoing patents and applications being assigned to the same assignee as the present invention. In addition to the condensing agents disclosed in the aforementioned patents and patent applications, one may also employ with satisfactory results such condensing agents as, for instance, various alkali-metal hydroxides, for example, potassium hydroxide, sodium hydroxide, etc.

Although the silicone rubber, when applied to the cupreous surface, may be cured by the application of heat alone, it has been found expedient to incorporate a cure accelerator in the silicone rubber prior to application to the cupreous surface, and thereafter subject it to temperatures of the order of from about 100° to 250° C. for such time as is necessary to cure the silicone rubber. Among such cure accelerators may be mentioned, for example, benzoyl peroxide (disclosed and claimed in Wright et al. Patent 2,448,565, issued September 7, 1948), zirconyl nitrate (disclosed and claimed in Wright Patent 2,453,562, issued November 9, 1948), tertiary butyl perbenzoate (disclosed and claimed in Marsden application, Serial No. 763,445, filed July 24, 1947, now U. S. Patent 2,521,528, issued September 5, 1950), etc.

The thickness of the silicone rubber film may be varied within wide limits without departing from the scope of the invention depending, for example, on the particular application and use of the claimed product. In many cases, thicknesses of the order of from about 1 mil to 40 mils or more may be employed.

Any suitable means may be employed for removing the oxide film on the cupreous material. Generally, this requires the use of an oxide remover and an oxide inhibitor. I have found it especially satisfactory to employ for this purpose a one-step operation comprising a bath comprising a water solution of either sodium dichromate or chromium trioxide and phosphoric acid. Other cleaning or oxide removers, in addition to phosphoric acid, which may be employed for the same purpose and which by actual test have been found suitable are, for example, hydrochloric acid, nitric acid, sulfuric acid, etc. Examples of materials which may be used in place of chromium trioxide are, for instance, sodium nitrite, sodium chromate, potassium chromate, lithium chromate, potassium peroxychromate, sodium dichromate, potassium dichromate, ferrous chromate, etc. The essential feature in using chromium compounds in connection with the acids mentioned above for treating the surface of the copper or copper alloy is that in the treating solution there be present at least a slight trace of chromium oxide ion, e. g., $CrO_4^{=}$, $Cr_2O_7^{=}$, etc. In addition, the oxide remover and oxide inhibitor is preferably employed in one treating bath since attempts to use separate successive treatments with each material have not given as good results.

In calendering the silicone rubber onto the copper-type surface, it has been found desirable to prevent contamination of the layer of silicone rubber deposited on the copper by also feeding into the calender rolls a protective, easily strippable sheet of such material as, for example, cellulose acetate, regenerated cellulose, etc., in such a manner that the protective sheet emerges from the other side of the calender rolls deposited on the silicone rubber surface. Prior to use, the protective sheet is removed to expose the surface of the silicone rubber for whatever future application may be intended.

Although in some applications the various silicone rubbers may be employed without further modification, I have found it desirable in order to increase the strength of the silicone rubber to incorporate in the said material various fillers usually employed for that purpose in the art as, for instance, titanium dioxide, ferric oxide, calcium carbonate, various silicas, lithopone, magnesium oxide, etc. In some applications, especially where it is desired to obtain good heat transfer properties between a thin, flexible copper sheet coated with a filled silicone rubber and a cold surface, I have found it extremely desirable that the filler employed comprise titanium dioxide, or mixtures of the latter and lithopone. The proportion of filler employed may be varied widely depending, for instance, on the type of filler employed, the application intended, etc., without departing from the scope of the invention.

The general procedure for practicing my claimed invention involves first degreasing and removing other foreign material from the cupreous surface and thereafter immersing it in the treating solution, many examples of which have been given above. After subjecting the copper article to such treatment, it should be thoroughly washed with water to remove all traces of acid.

In order that those skilled in the art may better understand how the present invention may be practiced, the following examples are given by way of illustration and not by way of limitation. All parts are by weight.

In order to carry out the tests described in the examples below, two silicone rubber pastes were prepared as follows:

SILICONE RUBBER PASTE NO. 1

Liquid polymeric dimethylsiloxane containing approximately one mol per cent copolymerized monomethylsiloxane was condensed in the presence of a condensing agent consisting of ferric chloric hexahydrate by heating the same in accordance with the disclosures of the aforementioned Agens Patent 2,448,756 until a solid, elastic product was obtained. Approximately 100 parts of the above obtained silicone gum were added to 200 parts of lithopone and 2 parts benzyl peroxide (as a cure accelerator) by mixing the ingredients on rubber compounding rolls until a homogeneous paste or dough was obtained.

SILICONE RUBBER PASTE NO. 2

Liquid polymeric dimethylsiloxane containing approximately one mol per cent copolymerized monomethylsiloxane was condensed by heating the same with potassium hydroxide as a condensing agent until a solid, elastic product (gum) was obtained. To 100 parts of this silicone gum were added 200 parts titanium dioxide and 2 parts benzyl peroxide and the mixture compounded on rubber compounding rolls until a homogeneous composition was obtained. About 900 parts, by weight, of this filled silicone rubber were added to 100 parts of a titanium dioxide filled silicone rubber prepared in accordance with the disclosures and directions in the previously mentioned Poskitt and Irby patent. This latter filled silicone rubber contained 0.4 mol per cent copolymerized monomethylsiloxane and a small amount of benzoyl peroxide, there being present equal amounts of silicone rubber gum and titanium dioxide. The two filled materials were again compounded on rubber compounding rolls until a homogeneous paste was obtained.

*Example 1*

In this example, a flexible copper sheet about 2 mils in thickness in the form of a tape was degreased, using the usual solvents for that purpose, and thereafter dipped for about 30 seconds into a hot, boiling bath (212° F.) comprising a water mixture of chromium trioxide and phosphoric acid, more particular details as to the composition of this bath being disclosed below in Example 2. The copper tape was removed, washed thoroughly with water and dried (with jets of cool air).

The treated copper surface was coated with silicone rubber paste No. 1 by passing the same, together with the silicone rubber, through calender rolls to deposit a thin adherent layer (about 20 mils thick) of silicone rubber. The coated copper tape was heated at about 150° C. for approximately 15 minutes to get a cured silicone rubber-coated tape from which the silicone rubber could not be stripped without destroying the rubber itself. The bond was permanent and resisted deterioration even when heated at elevated temperatures for extended periods of time. In addition, the tape remained flexible at low temperatures and was unaffected by moisture.

The cured tape obtained in this example was coated on the side free of the silicone rubber with a normally and stably tacky pressure-sensitive adhesive comprising a mixture of, for example, natural crepe rubber with polyisobutylene or coumarone-indene resin. Of course, as will be apparent, I may use any one of the many other pressure-sensitive adhesives well known to persons skilled in the art, as, for example, the many kinds of pressure-sensitive adhesives disclosed in U. S. Patent 2,453,258, issued November 9, 1948. This tape, which is shown graphically in Figure 1 in the accompanying drawing was then employed as a sealing tape for a metal roof comprising sheets or shingles of copper in the manner disclosed and claimed in my copending application, Serial No. 77,043, filed concurrently herewith and assigned to the same assignee as the present invention. When the overlapping interlocking edges of adjacent copper sheets were hammered into position in the manner indicated in my aforementioned copending application, there was produced a water-tight joint which remained flexible at the extremes in temperature to which roofs may be subjected (for example, 55° C. to −50° C.) for long periods of time without any perceptible change in the properties of the cured silicone rubber.

*Example 2*

Copper sheet foil in the form of a tape about 2 to 3 mils thick was degreased by immersing it for a short period of time in the usual solvents and then into a hot boiling bath (212° F.) comprising an aqueous solution of chromium trioxide and phosphoric acid, which was prepared by dissolving 20 parts chromium trioxide in about 1000 parts water and adding to this solution about 59.4 parts of 90 per cent phosphoric acid. The copper foil was kept in the bath for about 30 seconds, removed, washed thoroughly with water and dried with jets of cool air.

A pool of silicone rubber paste No. 2 was placed on the treated copper surface and fed into calender rolls at the same time so as to lay down a thin adherent layer (about 3 to 8 mils) of silicone rubber on the treated copper surface. Heating the copper foil for about 2 minutes at 105° C. cured the silicone rubber and resulted in a strong adherent bond between the silicone rubber and the copper surface. The bond was stable even when heated to 250° C.

The above-identified uncured silicone rubber coated copper tape was employed as a means for fastening a copper tube (used in carrying a refrigerating fluid employed to cool the walls of refrigerators) to the porcelain surface of a cold wall refrigerator. This was accomplished by first wiping the porcelain surface of the refrigerator with a 2 per cent toluene solution comprising dimethyltetrachlorodisilane, which procedure is more particularly disclosed and claimed in my copending application referred to previously, Serial No. 77,045, filed concurrently herewith. Thereafter, the copper tube was positioned on the porcelain surface and the silicone rubber coated copper tape was applied over the copper tube so that the silicone rubber surface contacted the copper tube and the treated porcelain surface in such a manner that the two ends of the copper tape overlapped past the copper tube in the form of a U-shape in which the ends were flattened out against the porcelain surface.

Mere contact of the silicone rubber with the porcelain surface treated with the dimethyltetrachlorodisilane resulted in a good bond simulating the effect of a pressure sensitive adhesive. By passing a hot iron over the surface of the copper tape for about 2 minutes caused the silicone rubber to cure and resulted in an increase in the strength of the bond to the porcelain surface to such a measure that the copper tape could not be stripped from the silicone rubber nor could the silicone rubber be stripped from the porcelain surface without destroying the silicone rubber layer itself. This bond remained flexible at low temperatures (for example, −20° C.) and was unaffected by moisture.

Instead of making separate copper tapes, I have also found it expedient to bend into a U-shaped form the treated copper foil and spraying solutions of silicone rubber on the treated copper tapes to give preformed thermal transfer sealing units.

The foregoing method of adhering tubes to various surfaces, especially adhering copper tubes to the porcelain walls of refrigerators, avoids many disadvantages now encountered in the art for accomplishing the same purpose by other means. It obviates the use of spot-welded clips which hold the copper tube in place and also removes the necessity for using messy pastes as heat transfer mediums. In addition, by means of the above described procedure, it is possible to accelerate the fixing of the copper tubes onto the porcelain surfaces of refrigerators so as to realize important savings in both the number of operations required and in the cost of materials, as well as a substantial reduction in time required for accomplishing the result.

It will, of course, be apparent to those skilled in the art that instead of treating only one surface of the cupreous article, all surfaces may be treated and uncured silicone rubber applied thereto in the same manner as described above. In addition to the applications described above, my claimed materials may also be employed where heat- and cold-resistant gaskets are desired by taking advantage of the properties of silicone rubber and increasing its strength by using as a backing material either a thin sheet or foil of copper or copper alloy.

If desired, copper or copper alloy tapes or sheets bonded to cured silicone rubber may in turn be bonded to other surfaces through the silicone rubber coating by first applying to the latter coating, and to the surface to which it is desired to adhere the silicone rubber, a thin coating of a methyl halogenodisilane in the manner disclosed and claimed in my aforementioned copending application, Serial No. 77,045, and thereafter interposing a thin layer or film of uncured silicone rubber, preferably filled, and thereafter subjecting the total assembly to heat and pressure to yield a firm adherent flexible bond.

The claimed cupreous, flexible sheets or tapes coated with uncured filled silicone rubber, can be employed as noiseless cooling fins on air-cooled rectifiers, power tubes, motors, etc., by pinching the silicone rubber surface together to form an inverted T-shaped article, attaching the arms of the T to the motor in the desired places by methods disclosed and claimed in my aforementioned copending application Serial No. 77,045 and heating the tape until curing of the silicone rubber has occurred both to the motor and between the two pinched surfaces.

Another application for the claimed compositions of matter comprises their use for sealing holes or cracks in radiators by first applying around the surface of the crack or hole a coating of an organohalogenodisilane as described in my aforementioned copending application Serial No. 77,045 and adhering the silicone rubber coated copper or copper alloy sheet or tape by heating the same while in contact with the coated surface.

Heat-curable, solid, elastic organopolysiloxanes have been employed to insulate electrical conductors, for example, electrical bus bars, cables, etc. Although such insulated products have outstanding heat resistance, they are susceptible to one disadvantage in that the abrasion resistance of the silicone rubber is, under some conditions, unsatisfactory. By means of my claimed invention, it is possible to obviate this difficulty by employing the claimed cupreous articles, particularly in the form of silicone rubber-coated tapes, which can be wound around such insulated objects as bus bars and cables, by first treating the cured silicone insulation of the latter objects with an organohalogenodisilane and thereafter winding an uncured silicone rubber-coated copper tape around the bus bar or cable and subjecting the same to heat, and pressure, if desired. However, by tight winding of the tape, it may be possible to omit the use of pressure. In the case where the silicone rubber coating on the cupreous tape is in the cured state, it may be desirable to also coat the latter with an organohalogenodisilane and interpose between this coated silicone rubber and the coated silicone rubber insulating the bus bar or cable an uncured silicone rubber paste prior to winding the copper tape and curing it as described above.

Figure 2:
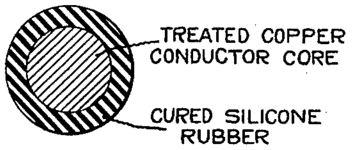

It is possible by means of my claimed invention to make improved electrical conductors containing insulation therefor comprising a silicone rubber. Thus, for example, copper electrical conductors may be treated in the same manner as the flexible copper tapes described above as, for instance, by passing the copper conductor through a bath comprising, for instance, sodium dichromate and phosphoric acid at room temperature, and thereafter applying to the treated surface of the copper conductor an uncured elastic curable organopolysiloxane containing a cure accelerator such as benzoyl peroxide, and heating the same until curing of the silicone rubber is obtained. Conductors prepared in such a maner, of which Figure 2 in the accompanying drawing is a cross-sectional view, have been found to have improved physical and electrical properties at elevated temperatures due to the firm bond between the silicone rubber and the surface of the copper core. In preparing such electrical conductors it will, of course, be apparent that fibrous inorganic coatings such as glass braid may be superimposed upon the electrical conductor prior to treatment with the silicone rubber. The latter impregnates the interstices of the fibrous coating and contacts the surfaces of the copper core to yield an insulated conductor having desirable properties to which both the inorganic fibrous coating and the silicone rubber are firmly bonded.

What I claim as new and desire to secure by Letters Patent of the United States is:

1. The process of adhering silicone rubber to a copper surface which comprises (1) treating the surface of the copper with a mixture comprising chromium trioxide and phosphoric acid, and (2) applying to the said treated copper surface an adherent layer of a solid, elastic, curable organopolysiloxane containing a filler.

2. The process of adhering silicone rubber to a flexible backing of copper which comprises (1) treating at least one surface of the copper sheet with a mixture comprising chromium trioxide and phosphoric acid, and (2) applying to the said treated surface of the copper backing an adherent layer of a solid, elastic, curable methylpolysiloxane containing titanium dioxide as a filler.

3. The process of adhering silicone rubber to a flexible sheet of copper alloy which comprises (1) treating at least one surface of the copper sheet with a mixture comprising chromium trioxide and phosphoric acid, and (2) applying to the said treated surface an adherent layer of a solid, elastic, curable methylpolysiloxane containing a filler comprising titanium dioxide.

4. The process which comprises (1) treating one surface of a copper backing with a mixture comprising a solution of chromium trioxide and phosphoric acid, (2) applying to the treated surface of the copper backing an adherent layer of a solid, elastic, curable methylpolysiloxane containing a filler comprising titanium dioxide, (3) heating the coated sheet until curing of the methylpolysiloxane is effected, and (4) applying to the other surface of the copper sheet a pressure-sensitive adhesive.

ROBERT SMITH-JOHANNSEN.

(References on following page)

REFERENCES CITED

The following references are of record in the file of this patent:

UNITED STATES PATENTS

| Number | Name | Date |
|---|---|---|
| 1,116,803 | Drainoff | Nov. 10, 1914 |
| 1,287,605 | Allen | Dec. 17, 1918 |
| 2,226,589 | Smyers | Dec. 31, 1940 |
| 2,258,218 | Rochow | Oct. 7, 1941 |
| 2,353,786 | Ross | July 18, 1944 |
| 2,415,030 | Rafter | Jan. 28, 1947 |
| 2,442,068 | Wolf | May 25, 1948 |
| 2,446,060 | Pray et al. | July 27, 1948 |
| 2,459,744 | Rafter | Jan. 8, 1949 |
| 2,460,795 | Warrick | Feb. 1, 1949 |
| 2,467,853 | Poskitt et al. | Apr. 19, 1949 |
| 2,468,239 | Saulino | Apr. 26, 1949 |
| 2,470,593 | Webb et al. | May 17, 1949 |
| 2,516,685 | Douty et al. | July 25, 1950 |
| 2,523,037 | Mathes | Sept. 19, 1950 |